United States Patent [19]

Supino

[11] Patent Number: 5,402,280
[45] Date of Patent: Mar. 28, 1995

[54] METHOD AND APPARATUS FOR RUNOUT CORRECTION DUE TO DISK SLIP OR SPINDLE IMBALANCE

[75] Inventor: Louis Supino, Colorado Springs, Colo.

[73] Assignee: Quantum Corp., Milpitas, Calif.

[21] Appl. No.: 880,929

[22] Filed: May 11, 1992

[51] Int. Cl.⁶ ............................................. G11B 5/596
[52] U.S. Cl. ............................... 360/77.04; 360/77.02; 369/43
[58] Field of Search ................. 369/44.13, 124, 44.11, 369/44.28, 44.29, 44.35, 44.36, 44.34, 54, 58, 32, 43; 360/75, 77.01, 77.17, 78.14, 77.03, 77.08, 78.04, 78.05, 78.06, 78.07, 77.04, 77.05, 77.02

[56] References Cited

U.S. PATENT DOCUMENTS

| | | | |
|---|---|---|---|
| 3,985,952 | 10/1976 | Adler | 369/44.13 |
| 4,136,365 | 1/1979 | Chick et al. | 360/78.05 |
| 4,416,002 | 11/1983 | Oguino et al. | 369/44.27 |
| 4,481,550 | 11/1984 | Miller et al. | 360/77.03 |
| 4,485,414 | 11/1984 | Baker | 360/75 |
| 4,536,809 | 8/1985 | Sidman | 360/77.04 |
| 4,581,567 | 4/1986 | Yamagawa et al. | 360/75 |
| 4,616,276 | 10/1986 | Workman | 360/77.04 |
| 4,628,379 | 12/1986 | Andrews, Jr. et al. | 360/77.05 |
| 4,764,914 | 8/1988 | Estes et al. | 369/58 |
| 4,788,608 | 11/1988 | Tsujisawa | 360/77.04 |
| 4,972,398 | 11/1990 | Wachi | 369/58 |
| 4,982,297 | 1/1991 | Tsujisawa | 360/77.04 |
| 5,016,233 | 5/1991 | Morimoto et al. | 369/44.13 |
| 5,072,318 | 12/1991 | Yu | 360/77.02 |

Primary Examiner—Aristotelis Psitos
Assistant Examiner—Thang V. Tran
Attorney, Agent, or Firm—David B. Harrison

[57] ABSTRACT

In a disk storage device, a method and apparatus for correcting a "runout" error by adding to the servo control signal a sinusoidal signal of amplitude and phase derived to cancel the runout error.

4 Claims, 5 Drawing Sheets

METHOD AND APPARATUS FOR RUNOUT CORRECTION DUE TO DISK SLIP OR SPINDLE IMBALANCE

FIELD OF THE INVENTION

This invention is generally related to the field of disk storage technology. The invention provides a method and apparatus for correcting tracking errors due to "runout" caused by disk slip of spindle imbalance using relatively little memory and computer overhead.

BACKGROUND OF THE INVENTION

Typically, in a disk storage device used in a data processing system, data is stored on a rotating disk in a set of concentric circular patterns termed "tracks". A read/write head or transducer is mounted on a carriage incorporated in a servo system that moves the head radially in a "seek" or "access" function in which the servo system moves a read/write head to a selected track from a previous track. When the head reaches the desired track, the servo system commences a "track following" function in which it accurately positions the head over the centerline of the selected track and maintains it in that position so that the head can record a series of data bits or, alternatively, retrieve a series of bits from the track as the disk rotates under the head. Large-capacity disk drives may incorporate a plurality of such disks mounted for rotation together on a single spindle.

It is common to have the head-positioning servo system sense the position of the read/write head by means of servo signals recorded in tracks on the disk pack and correct for a mispositioning of the head. The servo signals may be embedded in the data, for example, recorded in servo fields at the beginnings of the data track sectors. Alternatively, the servo signals may be recorded on a disk surface dedicated to servo signals.

Particularly where a disk is removable from the drive, there is the possibility that the center of the circular tracks on which data was previously recorded is not coincident with the center of the spindle, due to disk slip or spindle imbalances. This causes an error or disturbance, called a "runout," that is periodic at the frequency of the rotation of the disk.

Prior art methods applicable to correcting the runout error have included the sampling of errors at various points along a data track, storing those errors, and later recalling and applying them to the servo controller. U.S. Pat. No. 4,136,365 to Chick et al. for "Magnetic Disc Storage Devices Having Compensation for Dimensional Changes," describes such a system. U.S. Pat. No. 4,536,809, to Sidman for "Adaptive Misposition Correcting Method and Apparatus for Magnetic Disk Servo System," describes another such system, which dynamically derives and stores optimal correction signals.

The prior art approaches, however, require significant memory and computer overhead for the calculation and storage of correction signals.

SUMMARY OF THE INVENTION

The invention provides a method and apparatus for correcting tracking errors due to runout using less memory and overhead by simply adding a sinusoidal correction signal to the servo control signal at the frequency of rotation, with the phase and amplitude of the correction signal matched to the runout error. The phase and amplitude are each derived by multiplying of the position error signal with a sinusoidal signal at the frequency of rotation and accumulating the products within appropriate signal loops.

The derivations of the phase and amplitude of the correction signal may be performed at the "power up" or starting of the disk drive. In that case, the two values are stored for subsequent continuous application to the servo system in both the "seek" and track following modes. It is easily seen that the memory and computer overhead requirements are minimal.

BRIEF DESCRIPTION OF THE DRAWINGS

In order that the invention may be more clearly understood, reference is made to the accompanying drawings which show the illustrative embodiment and details of its operation.

DETAILED DESCRIPTION OF AN ILLUSTRATIVE EMBODIMENT

Figure 1:
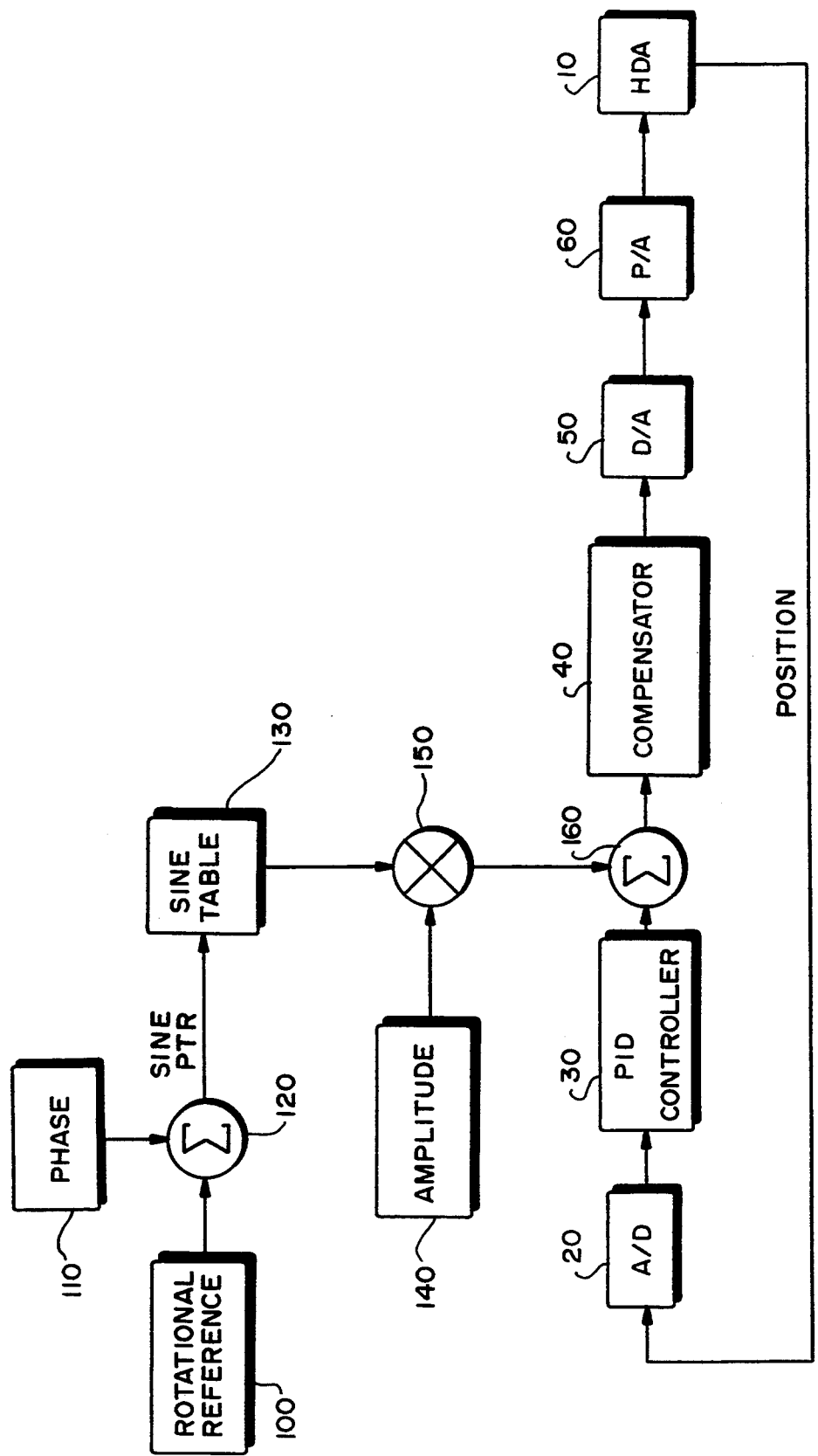
FIG. 1 is a functional block diagram of the illustrative embodiment as used to perform the runout correction.

Referring to FIG. 1 as an illustrative example, a head/disk assembly (HDA) 10, an analog-to-digital (A/D) converter 20, a PID ("Proportional-plus-Integral-plus-Derivative") controller 30, a compensator 40, a digital-to-analog (D/A) converter 50 and a power amplifier (P/A) 60 together form a standard servo control loop for positioning a read/write head or transducer (not shown) on a data track. This much of the arrangement of components preceded the present invention. As in other servo control loops, a position signal or position error signal is generated by the HDA 10 and a correction or control signal is generated by the control portion of the loop, amplified at the P/A 60, and returned to the HDA 10 to effect appropriate correction in the position of the transducer. The correction signal may be added at various points in the loop to other control signals, for example, control signals to the HDA for executing a "seek" operation to position the transducer over a track distant from the initial location of the transducer.

FIG. 1 shows a digital implementation of the servo control loop. The A/D converter 20 and D/A converter 50 allow the use of a digital signal processor to perform the functions of the compensator 40 and the PID controller 30. In the illustrative embodiment, the compensator 40 comprises a notch filter to reduce excitation of a flexure resonance and a lead compensator to add phase lead for stability and to account for servo lag. The PID controller 30 also compensates for servo lag, D.C. offset, biased torque and windage.

Although not shown in FIG. 1, the A/D converter shown as block 20 includes processing in addition to analog-to-digital signal conversion. In the illustrative embodiment, the position signal is first demodulated and then converted into digital signals. These digital signals may reflect a "fractional" position of the read/write head or transducer, in fractions of track widths, relative a track from which servo positioning signals are detected (either the track that the transducer is tracking, in a track following operation, or the nearest track, in a seek operation across multiple tracks). These signals may be multiplied by a value to give a properly scaled fractional position. The scaled fractional position then may be added to a track count (also scaled) to give the scaled position. This scaled position is then subtracted from a scaled value of the current or destination track to give the position error signal or PES. Other means are known for generating the PES.

The runout correction in the present invention is performed by adding to the correction signal for positioning the transducer a sinusoid of appropriate frequency, phase and amplitude to cancel out the position error due to runout. In the illustrative embodiment as shown in FIG. 1, the operation is performed by adding to the output of the PID controller 30 at the summer 160 such a sinusoidal signal.

The runout-correcting sinusoidal signal is generated by multiplying at multiplier 150 an amplitude stored at 140 (which may be random access memory) by a sine value obtained from a stored sine table 130. The sine value is selected by a pointer according to the output of the summer 120, which adds the rotational reference 100 (measured as samples, typically related to sectors, from an index position detected on the disk) and a phase value stored at 110 (which may be random access memory). Since the rotational reference returns to zero each time the read/write head or transducer approaches the index position on the disk, the period of the sinusoid is the same as the period of rotation of the disk. Thus, in a typical disk drive operating at 3600 rpm, the sinusoidal signal will be at a frequency of 60 Hz. The phase value stored at 110 and the amplitude stored at 140 respectively synchronize the sinusoid and provide it with the proper amplitude to cancel the disturbance.

Figure 2:
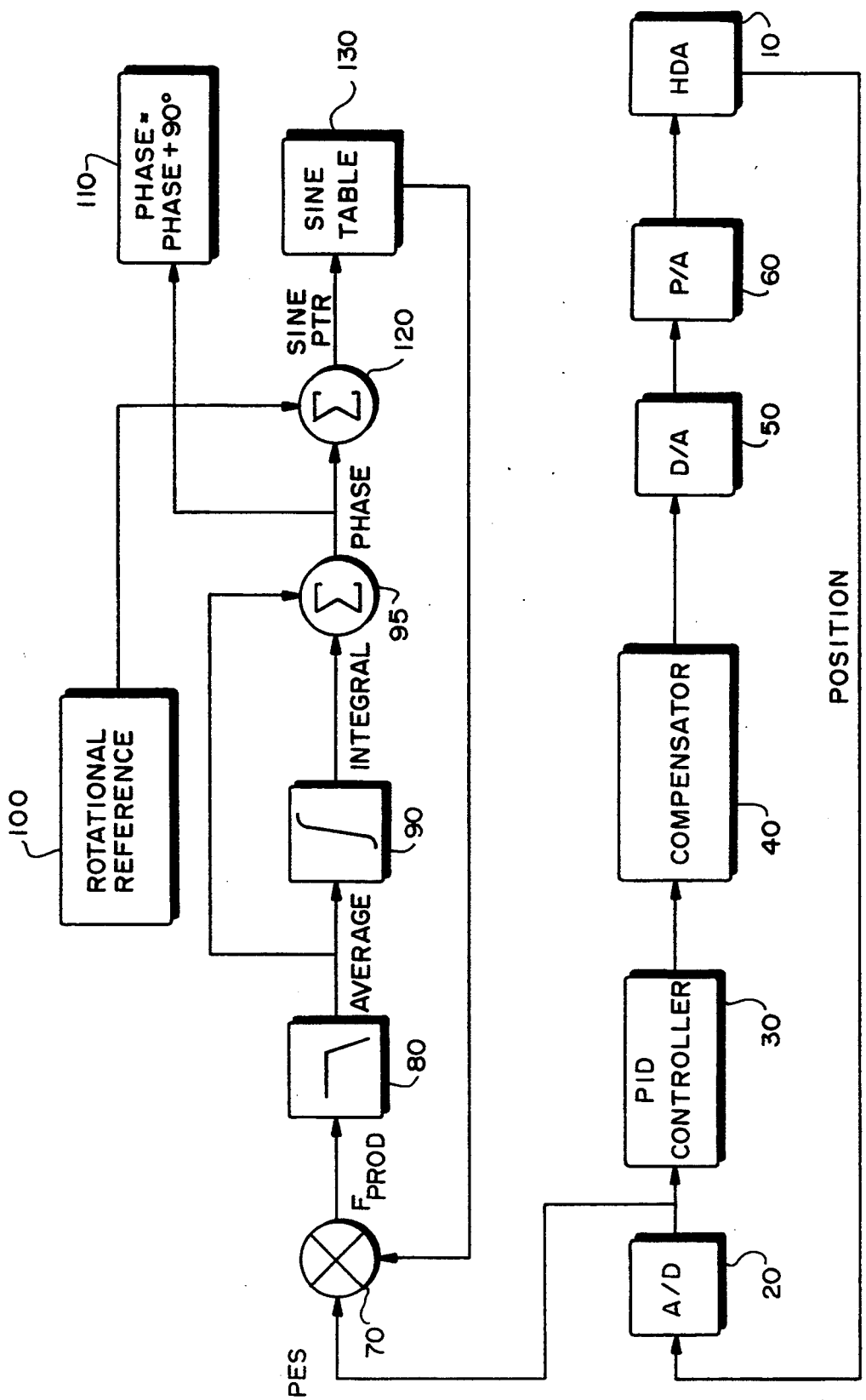
FIG. 2 is a functional block diagram of the illustrative embodiment as used to determine amplitude of a runout correction.
Figure 3:
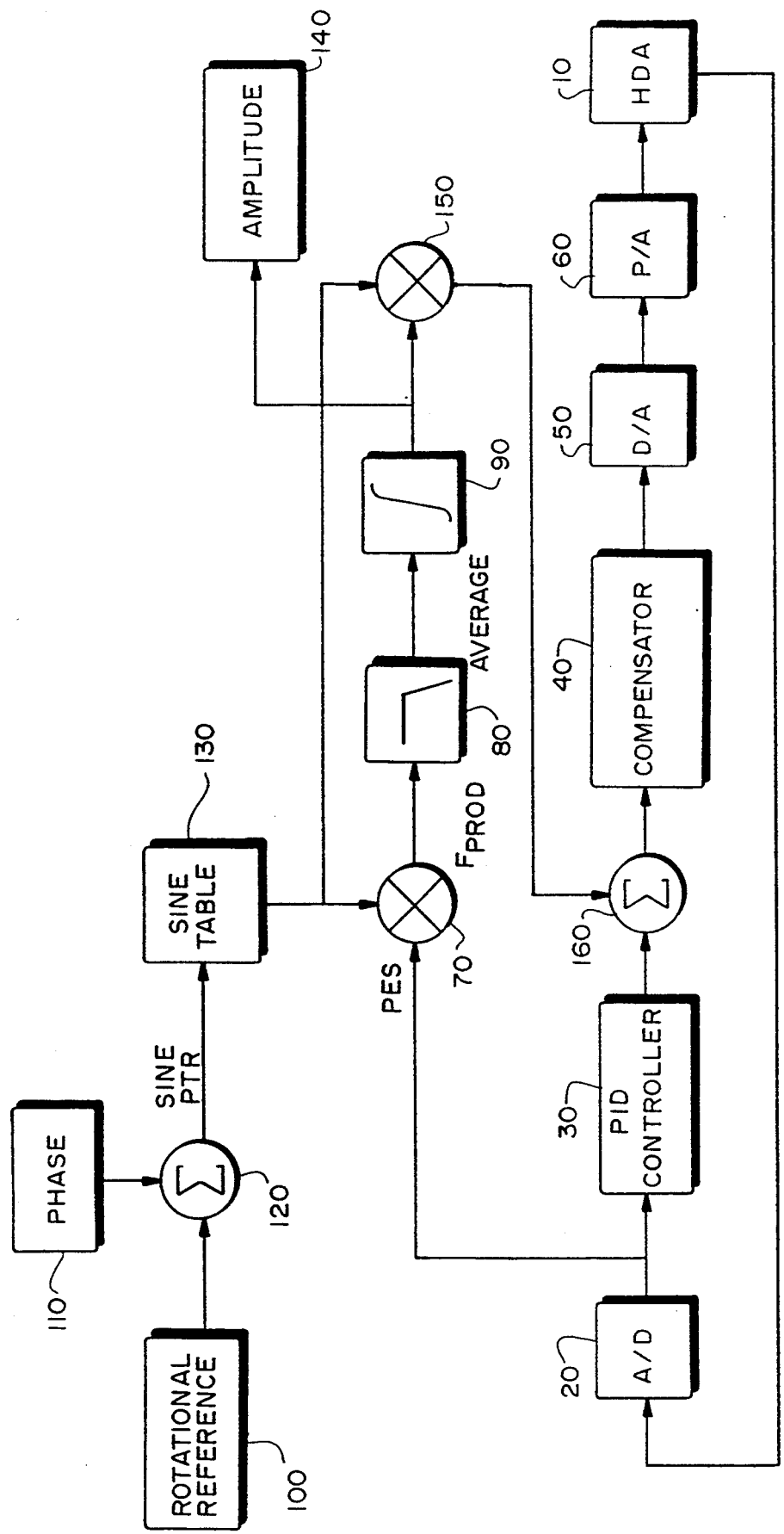
FIG. 3 is a functional block diagram of the illustrative embodiment as used to determine phase of a runout disturbance.
Figure 4:
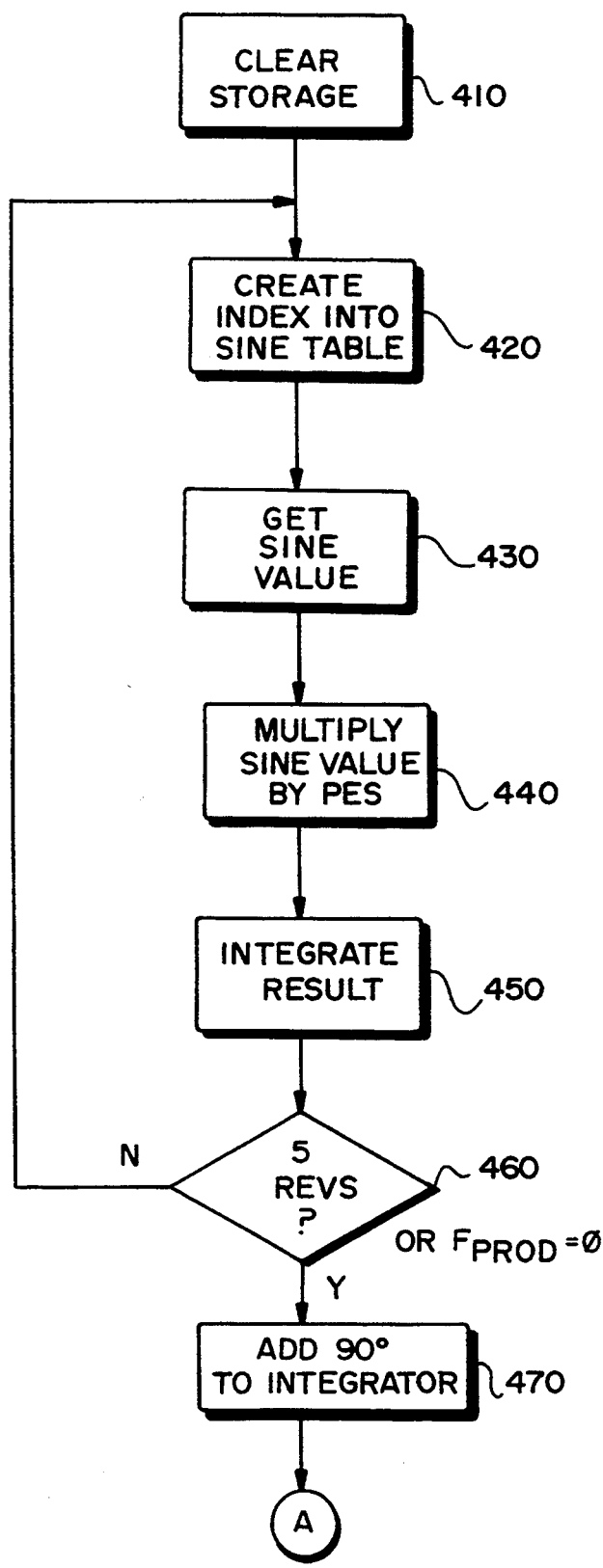
FIG. 4 is a flow chart of the illustrative process for determining phase of a runout disturbance.

In the illustrative embodiment, the phase value stored at 110 is derived as shown in FIGS. 2 and 4. When the disk drive is started up, storage locations for phase 110, amplitude 140 (FIG. 3) and the outputs of the integrator 90 and optional summer 95, shown in FIG. 2, are cleared 410 (FIG. 4). An index is created 420 (FIG. 4) into the sine table 130. Using as a pointer the output of summer 110, the sum of the intermediate phase value (output of integrator 90 or summer 95) and the rotational reference from 100, a sine value is obtained 430. The sine value is multiplied 440 (FIG. 4) at multiplier 70 with the position error signal (PES) taken from the output of the A/D converter 20, which reflects the runout error. The product, $F_{prod}$, is averaged in an optional low-pass filter 80 (with a 1 kHz cut-off in one embodiment, to filter out non-runout artifacts), and the average signal is integrated 450 (FIG. 4) at integrator or accumulator 90. The integral or accumulated result is optionally summed (to promote faster convergence) at summer 95 with the average $F_{prod}$ to result in an intermediate phase value. The intermediate phase value is then summed at summer 120 to result in a new pointer for selecting a new sine value.

The runout error component of the PES is referred to herein as the runout error disturbance and, depending upon a specific convention, may be in phase or opposite in phase to the runout error on the disk. Because it is a sinusoid of frequency equal to the rotational frequency of the disk, the runout error disturbance multiplied by the sinusoid derived from the sine table results in a signal of the form:

$$F_{prod} = a^*\sin(\omega t + A) * b^*\sin(\omega t + B)$$
$$= ab(.05)[\cos(A - B) - \cos(2\omega t + A + B)]$$

where $\omega$ is the rotational frequency, t is time, A is the phase of the runout error disturbance relative to the index position, and B is the phase of the sine table pointer. Making a substitution $B = A + \pi/2$ or $A = B - T\pi/2$, $$F_{prod} = ab(.05)[\cos(-90) - \cos(2\omega t + 2A + \pi/2)]$$
$$= ab(.05)\sin(2\omega t + 2A)$$

Recognizing that the average of this expression is zero over each sine cycle, the condition $B = A + \pi/2$ can be obtained by repeating steps 420 through 450 until the average of $F_{prod}$ equals zero. In other words, the sine table pointer will lead the runout error disturbance by $\pi/2$ or 90 degrees when the average of $F_{prod}$ equals zero. That condition theoretically could occur when the phase of the sine table pointer lags that of the runout error disturbance by 90 degrees, but the lag situation is unstable. Thus, in the illustrative embodiment, when the average of $F_{prod}$ equals zero, the sine table pointer leads the runout error disturbance by 90 degrees.

In practice, in an illustrative embodiment with a sampling rate of 224 samples per revolution, the loop settles (and the average of $F_{prod}$ equals zero) within five revolutions of the disk. Thus, in FIG. 4, steps 420 through 450 are repeated only through five revolutions, as shown in step 460. Then, a value corresponding to 90 degrees is added 470 to the output of the integrator (the intermediate phase value) to give the phase of the sinusoidal signal used to correct runout; that phase is stored in 110.

Figure 5:
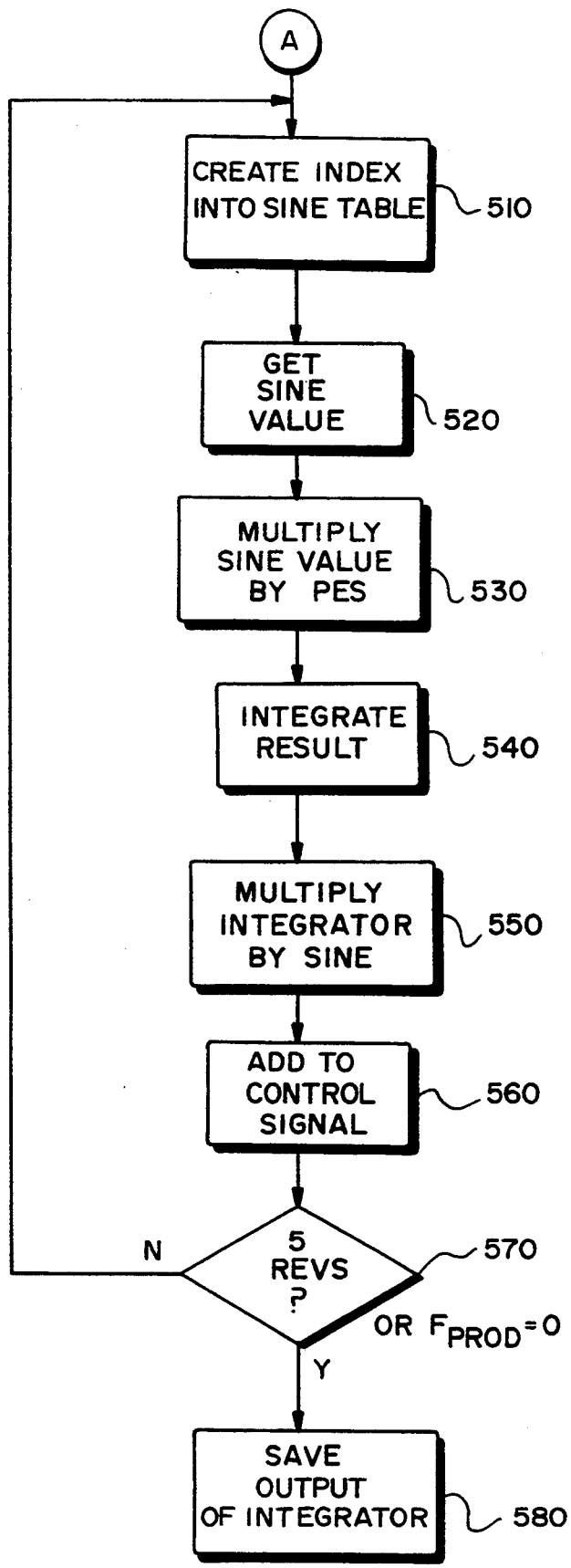
FIG. 5 is a flow chart of the illustrative process for determining amplitude of a runout correction.

The phase being determined, the amplitude of the runout-correcting sinusoid is then derived as shown in FIGS. 3 and 5. Again, storage locations for phase 110, amplitude 140 and the outputs of the integrator 90 and summer 95 shown in FIG. 3 are cleared 510 (FIG. 5). An index is created 520 into the sine table 130. Using as a pointer the output of summer 120, the sum of the phase stored at 110 and the rotational reference from 100, a sine value is obtained 520. The sine value is multiplied 530 (FIG. 5) at multiplier 70 with the position error signal (PES) taken from the output of the A/D converter 20, which still reflects the runout error. The product, $F_{prod}$, is averaged in an optional low-pass filter 80, and the average is integrated 540 at integrator or accumulator 90. The integral or accumulated result is the intermediate amplitude value and is multiplied 550 at multiplier 150 with the sine value obtained from 130. This results in a correcting sinusoidal signal which is added 560 at summer 160 to the output of the PID controller 30 to generate a correction signal to reposition the transducer at HDA 10.

Steps 510 through 560 (FIG. 5) are repeated until the runout error disturbance has been substantially corrected with a sinusoid of the phase stored in 110 (FIG. 3) and the intermediate amplitude value at the output of integrator 90. Associated with that condition are the conditions that the output of the multiplier 70, $F_{prod}$, and the output of the low-pass filter 80, the average $F_{prod}$, are substantially zero. Since in this implementation, the sinusoidal runout error disturbance component of PES is of the form, $a*\sin(\omega t)$, and the sinusoid multiplied with it at 70 is synchronized out of phase by 180 degrees (thus, of the form, $-b*\sin(\omega t)$), the component of interest in $F_{prod}$ is of the form, $-ab*\sin^2(\omega t)$, and will approach zero when the coefficient of the sinusoidal runout error disturbance, a, approaches zero. Also at this time, the intermediate amplitude value at the output of the integrator 90 becomes constant.

The amplitude in the illustrative embodiment, being an accumulation of $F_{prod}$ of the form, $-ab*\sin^2(\omega t)$, is a negative number. Thus, referring to FIG. 3, the runout-correcting sinusoidal output from multiplier 150 is in phase with the runout error disturbance component of the PES input into multiplier 70. This is consistent with the fact that, in the servo loop configuration of FIG. 3, without the addition at summer 160 of the runout-correcting sinusoid, the runout error disturbance component of the PES, as processed by PID controller 30, will cause the remainder of the loop to attempt to correct the runout error. Although small amplitude runout errors may be corrected in this fashion, in the general situation, the loop gain is inadequate to allow the PES itself to make the runout correction timely. The present invention allows for simple predetermination of the required correction and application to anticipate and "preempt" subsequent positioning errors due to runout.

In the illustrative embodiment shown in FIG. 3, the stabilization of the amplitude-determining loop has been found to occur within five revolutions to result in an intermediate phase value. Thus, in FIG. 5, steps 510 through 560 are repeated only through five revolutions, as shown in step 570. Then, the intermediate amplitude value at the output of the integrator 90 is stored at 140. As a result of the steps shown in FIGS. 4 and 5, the phase and amplitude values are provided for the operation of the invention as shown in FIG. 1.

As is well known in the art, the above operations and apparatus may be implemented in hardware or software or in a combination of hardware and software. Moreover, the various summers, filters, multipliers, and integrators may be separate hardware, or may use the same hardware. As mentioned previously, the illustrative embodiment employed a digital signal processor to perform a number of the recited functions.

Having described this invention, what is claimed as new and secured by Letters Patent are:

1. A method, comprising the steps of:
    generating a fixed-amplitude sinusoidal signal of frequency equal to the rotational frequency of a disk in a disk drive;
    generating a head position error signal indicating the degree of tracking error between a read head and a data track recorded on said disk, said head position error signal including a substantially sinusoidal runout error component caused by runout of said disk and having frequency equal to the rotational frequency thereof;
    generating a head positioning signal independent of said sinusoidal signal and responsive to said head position error signal to position said read head in a manner effective to compensate for the tracking error between said read head and said data track;
    multiplying said head position error signal by said sinusoidal signal to obtain a product signal;
    averaging said product signal to obtain an average product signal;
    integrating said average product signal to obtain an intermediate phase value;
    adjusting the phase of said sinusoidal signal relative to a rotational index position of said disk to be equal to said intermediate phase value;
    monitoring the value of said average product signal to determine when it has reached substantially zero;
    when said average product signal has been determined to have reached substantially zero, adding 90 degrees to said intermediate phase value to obtain the phase of said periodic runout error component of said head position error signal relative to said rotational index position of said disk;
    determining the amplitude of said periodic runout error component of said head position error signal;
    generating a sinusoidal correction signal having frequency equal to the rotational frequency of said disk and having phase and amplitude equal to those of said periodic runout error component of said head position error signal as determined in the foregoing steps; and
    adding said sinusoidal correction signal to said head positioning signal to compensate for the runout of said disk.

2. A method, comprising the steps of:
    generating a head position error signal indicating the degree of tracking error between a read head and a data track recorded on said disk, said head position error signal including a substantially sinusoidal runout error component caused by runout of said disk and having frequency equal to the rotational frequency thereof;
    generating a head positioning signal responsive to said head position error signal to position said read head in a manner effective to compensate for the tracking error between said read head and said data track;
    determining the phase of said runout error component of said head position error signal relative to a rotational index position of said disk;
    generating a sinusoidal signal of frequency equal to the rotational frequency of said disk and having phase equal to the determined phase of said runout error component of said head position error signal;
    multiplying said head position error signal by said sinusoidal signal to obtain a product signal;
    averaging said product signal to obtain an average product signal;
    integrating said average product signal to obtain an intermediate amplitude value;
    multiplying said sinusoidal signal by said intermediate amplitude value to obtain a runout-correcting sinusoidal signal;
    adding said runout-correcting sinusoidal signal to said head positioning signal;
    monitoring the value of said average product signal to determine when it has reached substantially zero, whereupon the value of said intermediate amplitude is taken to be the amplitude of said runout error component of said head position error signal;
    ceasing to add said runout-correcting sinusoidal signal to said head positioning signal after the amplitude of said runout error component of said head position error signal has been determined;
    generating a sinusoidal correction signal having frequency equal to the rotational frequency of said disk and having phase and amplitude equal to those of said periodic runout error component of said head position error signal as determined in the foregoing steps; and adding said sinusoidal correction signal to said head positioning signal to compensate for the runout of said disk.

3. Apparatus, comprising:

means for generating a fixed-amplitude sinusoidal signal of frequency equal to the rotational frequency of a disk in a disk drive;

means for generating a head position error signal indicating the degree of tracking error between a read head and a data track recorded on said disk, said head position error signal including a substantially sinusoidal runout error component caused by runout of said disk and having frequency equal to the rotational frequency thereof;

means for generating a head positioning signal independent of said sinusoidal signal and responsive to said head position error signal to position said read head in a manner effective to compensate for the tracking error between said read head and said data track;

a multiplier for multiplying said head position error signal by said sinusoidal signal to obtain a product signal;

a low-pass filter for averaging said product signal to obtain an average product signal;

an integrator for integrating said average product signal to obtain an intermediate phase value;

means for adjusting the phase of said sinusoidal signal relative to a rotational index position of said disk to be equal to said intermediate phase value;

means for monitoring the value of said average product signal to determine when it has reached substantially zero;

a first adder for adding 90 degrees to said intermediate phase value when said average product signal has been determined to have reached substantially zero, the output of said adder being taken as the phase of said periodic runout error component of said head position error signal relative to said rotational index position of said disk;

means for determining the amplitude of said periodic runout error component of said head position error signal;

means for generating a sinusoidal correction signal having frequency equal to the rotational frequency of said disk and having phase and amplitude equal to those of said periodic runout error component of said head position error signal as determined in the foregoing steps; and a second adder for adding said sinusoidal correction signal to said head positioning signal to compensate for the runout of said disk.

4. Apparatus, comprising:

means for generating a head position error signal indicating the degree of tracking error between a read head and a data track recorded on said disk, said head position error signal including a substantially sinusoidal runout error component caused by runout of said disk and having frequency equal to the rotational frequency thereof;

means for generating a head positioning signal responsive to said head position error signal to position said read head in a manner effective to compensate for the tracking error between said read head and said data track;

means for determining the phase of said runout error component of said head position error signal relative to a rotational index position of said disk;

means for generating a sinusoidal signal of frequency equal to the rotational frequency of said disk and having phase equal to the determined phase of said runout error component of said head position error signal;

a first multiplier for multiplying said head position error signal by said sinusoidal signal to obtain a product signal;

a low-pass filter for averaging said product signal to obtain an average product signal;

an integrator for integrating said average product signal to obtain an intermediate amplitude value;

a second multiplier for multiplying said sinusoidal signal by said intermediate amplitude value to obtain a runout-correcting sinusoidal signal;

a first adder for adding said runout-correcting sinusoidal signal to said head positioning signal;

means for monitoring the value of said average product signal to determine when it has reached substantially zero, whereupon the value of said intermediate amplitude is taken to be the amplitude of said runout error component of said head position error signal;

means for ceasing to add said runout-correcting sinusoidal signal to said head positioning signal after the amplitude of said runout error component of said head position error signal has been determined;

means for generating a sinusoidal correction signal having frequency equal to the rotational frequency of said disk and having phase and amplitude equal to those of said periodic runout error component of said head position error signal as determined in the foregoing steps; and a second adder for adding said sinusoidal correction signal to said head positioning signal to compensate for the runout of said disk.

* * * * *